May 13, 1924.
R. T. COLE
1,494,099
ANTIFRICTION BEARING AND METHOD OF PRODUCING THE SAME
Filed Sept. 25, 1919
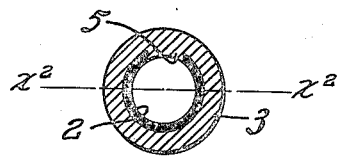
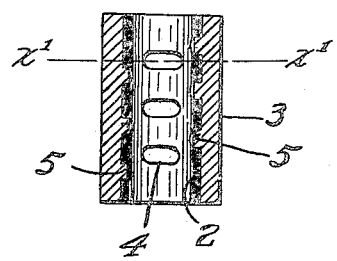
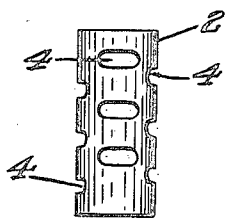
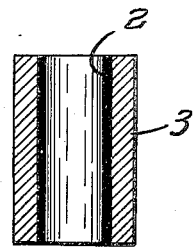
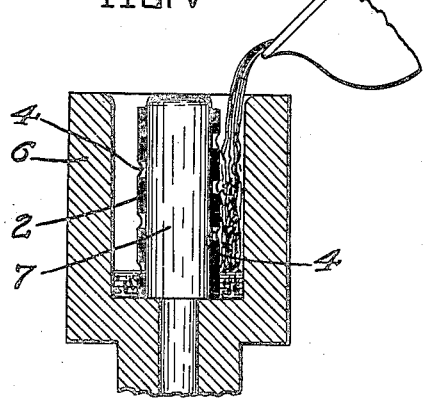
Inventor
Raymond T. Cole
By Joseph P. Livermore
Attorney Patented May 13, 1924.

1,494,099

UNITED STATES PATENT OFFICE.

RAYMOND T. COLE, OF WORCESTER, MASSACHUSETTS, ASSIGNOR TO MASSACHUSETTS OILLESS BEARINGS CORPORATION, OF WAKEFIELD, MASSACHUSETTS, A CORPORATION OF MASSACHUSETTS.

ANTIFRICTION BEARING AND METHOD OF PRODUCING THE SAME.

Application filed September 25, 1919. Serial No. 326,196.

*To all whom it may concern:*

Be it known that I, RAYMOND T. COLE, a citizen of the United States, and resident of Worcester, in the county of Worcester and State of Massachusetts, have invented an Improvement in Antifriction Bearings and Methods of Producing the Same, of which the following description, in connection with the accompanying drawings, is a specification, like reference characters on the drawings representing like parts.

This invention relates to an anti-friction or self-lubricating bearing for moving parts of machinery, and to a method of making the same.

In United States Patent No. 1,022,465, granted to me April 9, 1912, I have described a material for self-lubricating bearings composed of graphite uniformly distributed through a metal matrix, and a method of producing such material and of making bearings therefrom.

The object of the present invention is to produce a bearing which while having the self-lubricating property and character of the bearing described in said prior patent may be made of greater strength, and may have certain other properties which will be hereinafter set forth, which do not pertain to the bearing forming the subject of my previous invention.

The bearing forming the subject of the present invention is a compound bearing and consists of an inner portion or lining composed of graphited matrix material such as set forth in my former patent above mentioned, which is surrounded by and integrally united to a metallic body portion which may be of any suitable metal or alloy of metals such as bronze or brass.

The method of production by which the integral union of the graphited matrix material and body metal is effected will be hereinafter set forth.

Fig. 1, is a transverse section on line $x^1$ Fig. 2 of a cylindrical compound bearing piece embodying this invention, suitable for a bearing for a trolley wheel forming a part of an electric circuit.

Fig. 2, a longitudinal section thereof on line $x^2$ Fig. 1.

Fig. 3, a side elevation of the self-lubricating inner portion or lining of the bearing as it appears before being incorporated in the complete bearing.

Fig. 4, a longitudinal section of a similar bearing in which no provision for enhanced electric conductivity is made, and Fig. 5, a sectional view illustrating a step in the method of production.

A compound bearing of the construction shown in Figs. 1 and 2 is specially useful where enhanced electric conductivity is required, as for example, in the bearing of a trolley wheel of an electric car.

The compound bearing is composed essentially of an internal or lining portion 2 of graphited matrix material such as forms the subject of my prior patent, No. 1,022,465, and a metallic body portion 3 surrounding and enclosing said internal portion and integrally united or welded thereto as will be hereinafter described.

When the bearing has to serve only the mechanical function of supporting a moving part, such as a rotating shaft, the internal portion 2 which affords the bearing surface may be made as a complete tube, or with an uninterrupted bearing surface as shown in Fig. 4; in which construction the metallic body portion 3 enhances the strength of the bearing, and may be made of any desired form or shape of external surface, while only a sufficient portion of the graphited matrix material to afford an effective and lasting self-lubricating bearing portion need be used.

In some cases, it is desirable to provide for electric conductivity from the bearing portion to the part supported thereby as in the case of the bearing for the trolley wheel of an electric car, and in such cases the construction shown in Figs. 1 and 2 provides the necessary property.

In this construction the internal portion of the bearing which is composed of the graphited matrix material is provided with a number of perforations 4, and the body portion 3 has projecting portions 5, which enter the said openings and coincide with the inner bearing surface of the internal portion 4, and thus provided for making contact from the body portion 3 of the bearing to the shaft or part running therein.

Whether for purely mechanical purposes, or for also providing for electric conductivity, the body portion 3 may be of any suitable metal such as brass or bronze, or even pure copper, although some of the copper alloys are generally most desirable for the purpose.

The production of the bearing in accordance with one portion of the present invention involves the method by which the graphited matrix is produced as set forth in my former patent and is based upon a discovery I have made of a certain property of said graphited matrix material which would not naturally be expected to characterize the same.

Briefly stated the method of making a bearing from the graphited matrix forming the subject of my prior patent, comprises the coating of particles of graphite with a metal having a relatively high melting point and then distributing the same through a molten metal having a relatively low melting point, and casting the resulting mixture under a high pressure.

In actual commercial practice, the graphited matrix material is cast in dies under a pressure of several tons to the square inch.

I have discovered that while the metal matrix portion of a bearing piece produced as just described may have a comparatively low melting point, the casting made therefrom, after it has been cooled, cannot be melted at a much higher heat, having approximately the heat resistance of a graphite crucible material.

Accordingly in order to produce the compound, or reinforced self-lubricating bearing, as it may be called, forming the subject of the present invention, the internal portion 2 which is to afford the bearing surface is first made by the process of my prior patent, by coating the flakes of graphite with a metal, such for example, as copper, having a relatively high melting point, then mixing said coated flakes with a metal, such as Babbitt metal, having a much lower melting point, and then die-casting the mixture under pressure to the form desired for the internal portion or lining of the compound or reinforced bearing to be produced.

Said internal portion when it is cooled and solidified is introduced into a mold such as indicated at 6 in Fig. 5 and the metal of which the external or body portion 3 of the bearing is to be made is then poured in molten condition into the said mold and into contact with the surface of the internal piece 2.

The metal of the body portion, although it may be at a much higher temperature than the melting point of the metal matrix of the internal bearing piece does not fuse the same, owing to the refractory nature of the latter above stated, but along the surface at which it makes contact there is a local fusing action which results in an alloying of, or integral union between the two components of the bearing, which is an important characteristic of the complete bearing and one which could not be obtained by the usual process of casting a more easily fusible metal on to a more refractory one.

Where the inner component 2 of the bearing is in the form of a tube as in the illustration herein shown, said component may be placed upon an iron core as shown at 7, Fig. 5, when in the mold 6 to facilitate the proper casting of the body metal upon the graphited matrix portion, and it is obvious that the mold 6 may be of any suitable shape according to the external shape or form required for the finished compound bearing piece.

While a bearing of the kind herein described is self-lubricating, and will run effectively without oil or with only a very slight amount of oil, it may through ignorance or inadvertence be supplied with an excess of lubricant which has a tendency to soften or disentegrate the graphited matrix material, and in such case the metallic body portion of the compound bearing being unaffected by the lubricant tends to prevent the disintegration or breaking up of the graphited portion while the integral union or alloying of the metal of the body portion with the matrix metal prevents any cleavage of the internal antifriction bearing piece from the body portion.

What I claim is:—

1. A self-lubricated bearing consisting of an internal portion affording the bearing surface composed of small particles of graphite incorporated in and distributed throughout a metal matrix having a relatively low fusing temperature, and a surrounding body portion of metal having a relatively high fusing temperature, integrally united with the said matrix metal.

2. A bearing consisting of an internal tubular portion affording a bearing surface composed of graphite particles distributed throughout a matrix metal having a relatively low fusing temperature and having openings to the bearing surface and a body portion of metal having a higher fusing temperature surrounding and integrally united with the matrix metal of said internal portion and having portions projecting through said internal portion and affording a part of the bearing surface.

3. An anti-friction bearing consisting of an internal portion affording the bearing surface and composed of small particles of graphite distributed throughout a matrix metal having a relatively low fusing temperature and separated from one another by said matrix metal and a metallic body portion having a higher fusing temperature surrounding said internal portion and integrally united to the matrix metal thereof.

4. The process of forming a compound anti-friction bearing which consists in first making a casting from graphited matrix material composed of graphite particles distributed throughout a metal matrix having a relatively low melting temperature; introducing said casting into a mold, and pouring molten metal or metal alloy having a higher melting temperature into said mold to cast the body portion of the compound bearing and cause the same to become integrally united with the internal portion.

In testimony whereof, I have signed my name to this specification.

RAYMOND T. COLE.